(12) United States Patent
Saeki

(10) Patent No.: US 6,957,846 B2
(45) Date of Patent: Oct. 25, 2005

(54) FRONT BODY STRUCTURE FOR VEHICLE

(75) Inventor: Hidetsugu Saeki, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/623,511

(22) Filed: Jul. 22, 2003

(65) Prior Publication Data

US 2004/0195862 A1 Oct. 7, 2004

(30) Foreign Application Priority Data

Aug. 5, 2002 (JP) ............................ P 2002-227863

(51) Int. Cl.$^7$ ............................................ B60R 21/00
(52) U.S. Cl. ............................ 296/187.1; 296/187.09; 280/784; 180/232
(58) Field of Search .................... 296/187.03, 187.09, 296/187.1; 180/232, 274; 280/784

(56) References Cited

U.S. PATENT DOCUMENTS

| | | | | |
|---|---|---|---|---|
| 2,156,730 A | * | 5/1939 | Kuner | 293/102 |
| 4,440,435 A | * | 4/1984 | Norlin | 296/187.09 |
| 5,118,160 A | * | 6/1992 | Kitagawa et al. | 296/187.03 |
| 5,372,216 A | * | 12/1994 | Tsuji et al. | 180/274 |
| 5,466,033 A | * | 11/1995 | Murakami et al. | 296/203.02 |
| 5,685,599 A | * | 11/1997 | Kitagawa | 296/204 |
| 6,131,685 A | * | 10/2000 | Sakamoto et al. | 180/232 |

FOREIGN PATENT DOCUMENTS

JP         2002-46648         2/2002

* cited by examiner

Primary Examiner—Joseph D. Pape
(74) Attorney, Agent, or Firm—McDermott Will & Emery LLP

(57) ABSTRACT

A vehicle front body structure includes a side-member front area 11F inclined outwardly in the width direction of a vehicle as directing ahead of the vehicle, a strength control mechanism C provided in the side-member front area 11F, a sub-side member 20 extending from the vicinity of a continuous base of the side-member front area 11F toward the front of the vehicle, substantially straight to an extension of a side-member rear area 11R. The front end of the sub-side member 20 is connected with the rear face of a bumper reinforcement 12. The sub-side member 20 is provided with a deformation-mode control mechanism D that allows the sub-side member 20 to be deformed inwardly in the width direction of the vehicle due to a collision input and interferes with a power unit P, forming an impact load transfer mechanism B.

21 Claims, 14 Drawing Sheets

T1＜T2＜T3＜T4＜T5

STRESS DISTRIBUTION
OF SECTION 7B-7B

FRONT BODY STRUCTURE FOR VEHICLE

BACKGROUND OF THE INVENTION

The present invention relates to a front body structure for a vehicle. As a countermeasure against vehicle collision, Japanese Patent Application Laid-open No. 2002-46648 discloses one front body structure for a vehicle, which is designed so as to absorb collision energy by contriving the configuration of an apron member attached to side members and further prompting appropriate axial collapses against the side members when an axial input is applied on the side members.

SUMMARY OF THE INVENTION

The above-mentioned front body structure is capable of appropriate and certain energy absorption under a collision such that a collision input acts on the side members directly. However, when a vehicle has a so-called "small-overlapping" collision that an input face of the collision concentrates in a lateral end of the vehicle body, it becomes difficult to transmit a collision input to the side member in a fore-and-aft direction of the vehicle. As a result, an energy absorption due to the deformation of the side member, in other words, an energy absorption at a front compartment as a whole is apt to be short. According to circumstances, it is feared to cause a remarkable increase in vehicle weight in order to suppress the deformation of a vehicle cabin in the same level as the deformation at a "large-overlapping" collision having a large overlapping ratio of collision.

In such a situation, it is an object of the present invention to provide a front body structure capable of inducing and promoting a lateral displacement of a vehicle rigid body when a vehicle has a "small-overlapping" collision such that its input face concentrates in a lateral end of the vehicle rigid body, thereby reducing a deformation amount of the vehicle body.

According to the present invention, the above-mentioned object is accomplished by a vehicle from body structure, comprising: a pair of longitudinal structural members; a front compartment formed inside the longitudinal structural members; a power unit connected to the longitudinal structural members and placed in the front compartment; and an impact load transfer mechanism formed outside the front compartment and changes the impact load direction to a lateral direction for transmitting the impact load to the longitudinal structural member and the power unit directly.

DETAILED DESCRIPTION OF THE PREFERRED EMBODIMENT

Referring to accompanying drawings, embodiments of the present invention will be described below.

Figure 1:
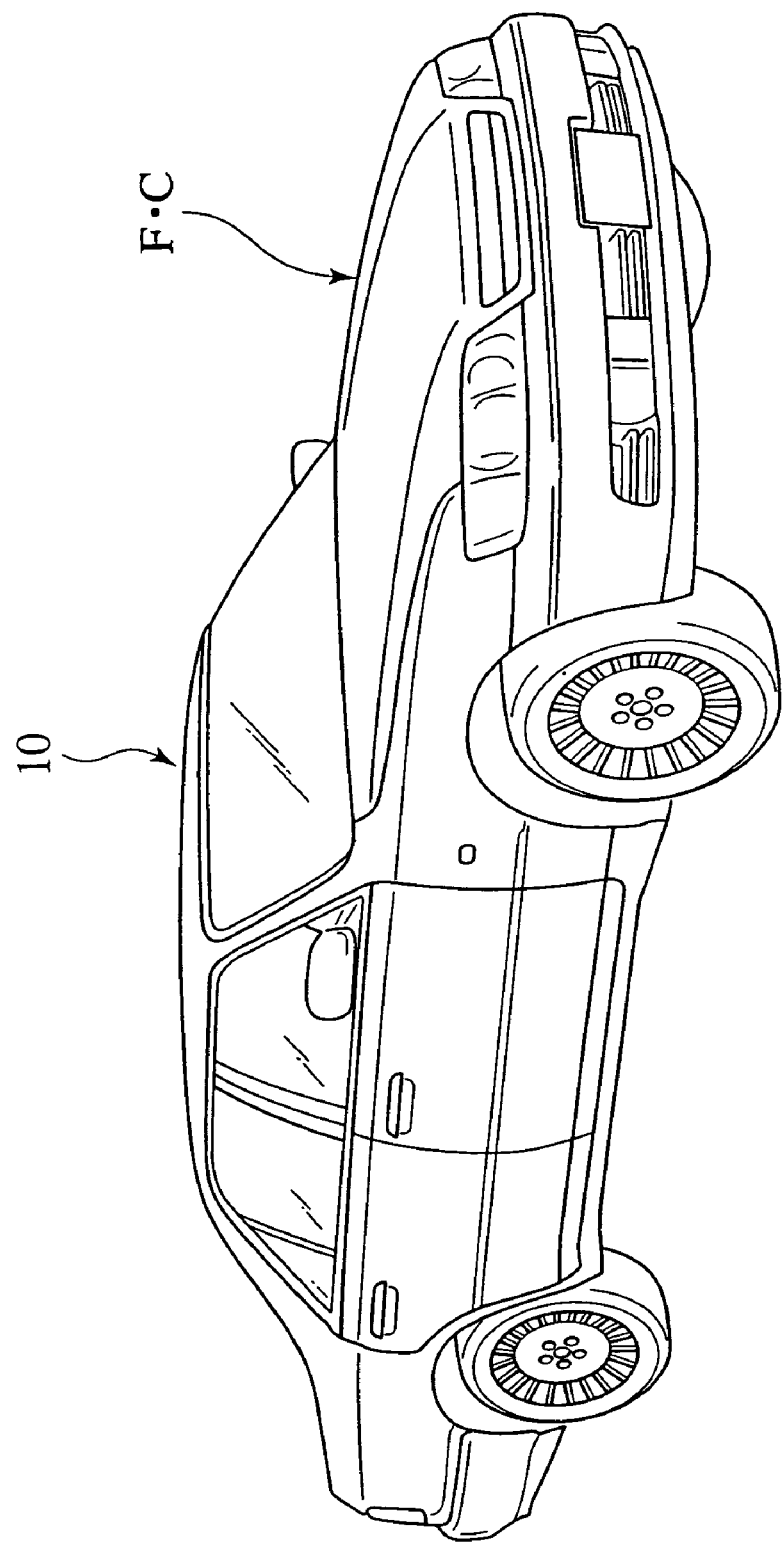
FIG. 1 is a perspective view of an automobile to which the present invention is applied.
Figure 2:
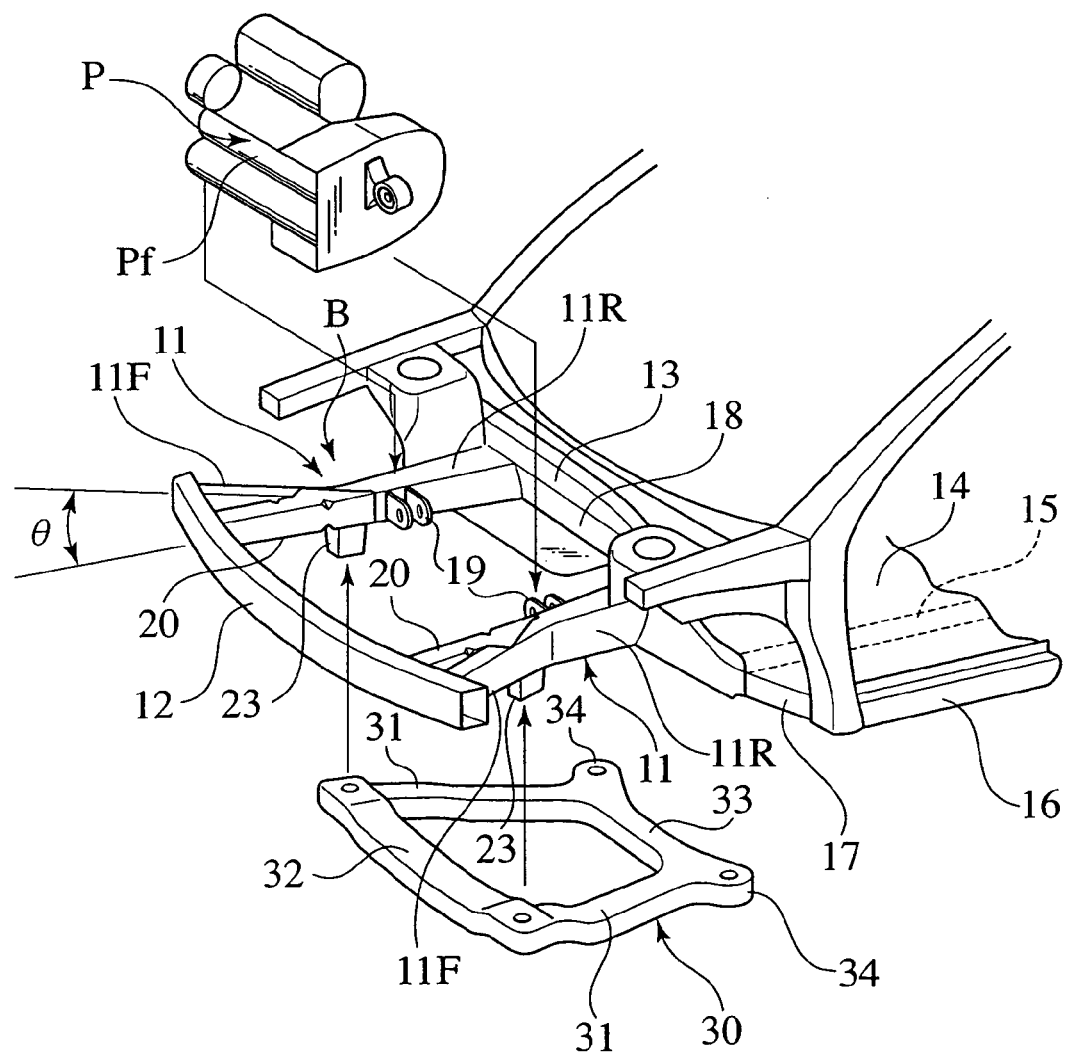
FIG. 2 is an exploded perspective view showing the skeletal structure of a front part of a vehicle body, in accordance with the first embodiment of the invention.
Figure 3:
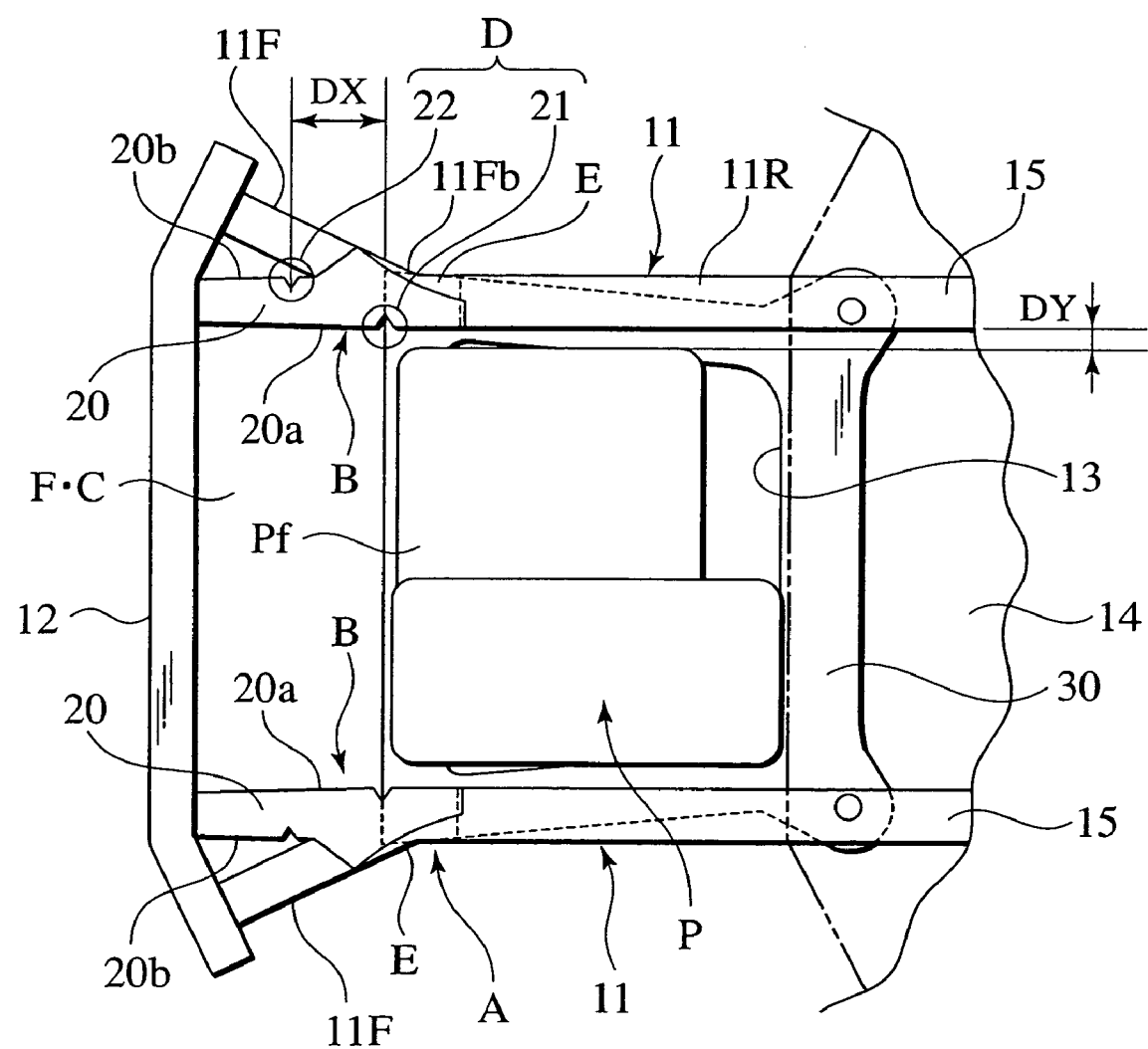
FIG. 3 is a schematic plan view of the skeletal structure of the front part of the vehicle body, in accordance with the first embodiment of the invention.

A front body structure of this embodiment is applied to a front compartment FC of a vehicle 10 of FIG. 1. In the skeletal structure, as shown in FIGS. 2 and 3, the front body structure includes a pair of side members 11 arranged on both (left-and-right) sides of the vehicle body 10 to extend in the fore-and-aft direction of the vehicle. The side members 11 are parallel with each other and have their front ends joined to a bumper reinforcement 12 forming the skeleton of a front bumper.

Behind each side member 11, an extension side member 15 is formed in succession so as to extend from a dash panel 13 to the underside of a floor panel 14. Outside the extension side members 15 in the width direction of the vehicle, a pair of side sills 16 are arranged so as to be substantially parallel with the extension side members 15. On each side of the vehicle, the front end of the extension side member 15 is connected with the front end of the side sill 16 through an outrigger 17.

A dash cross member 18 is joined to a junction part between each side member 11 and each extension side member 15.

As shown in FIG. 3, each side member 11 is provided, at an intermediate portion thereof, with a reinforcing part A having a mount bracket 19 (see FIG. 2) for mounting a power unit P consisting of an engine, a transmission, etc.

Figure 9:
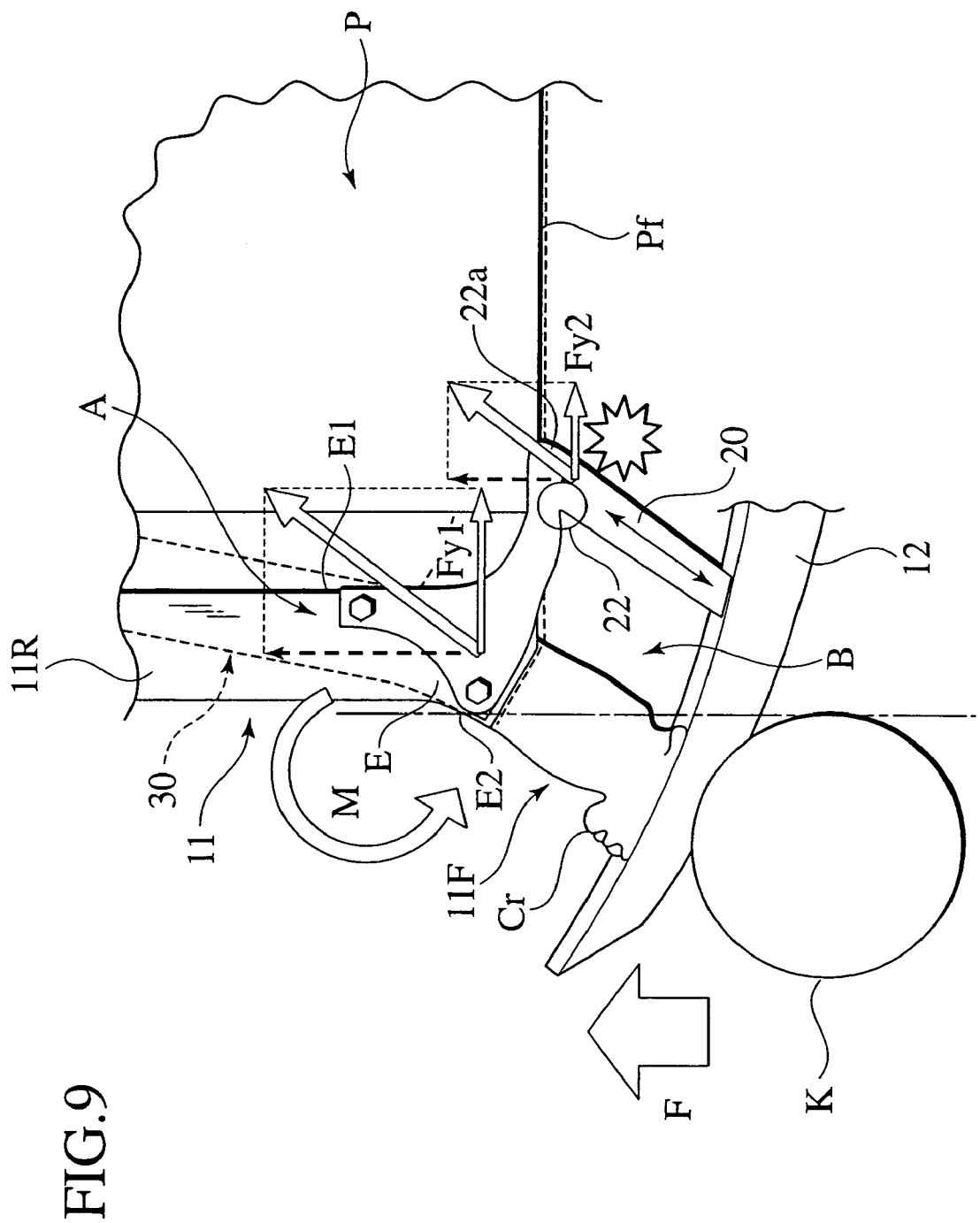
FIG. 9 is a schematic plan view showing the deformation mode of the front part on the right side of the vehicle body at the small-overlap collision, in accordance with the first embodiment of the invention.

According to the embodiment of the invention, as shown in FIG. 9, the front body structure includes an impact load transfer mechanism B that, when a collision input F directed rearwardly of the vehicle 10 is applied on the lateral side of a vehicle front end, converts the collision input F to lateral forces Fy1, Fy2 directed inwardly in the width direction of the vehicle 10 and further transmits the forces Fy1, Fy2 to the power unit P and a skeletal member installed in the front compartment FC directly. In detail, the impact load transfer mechanism B is formed by a side-member front area 11F of the side member 11 and a sub-side member 20 both described later.

Figure 4:
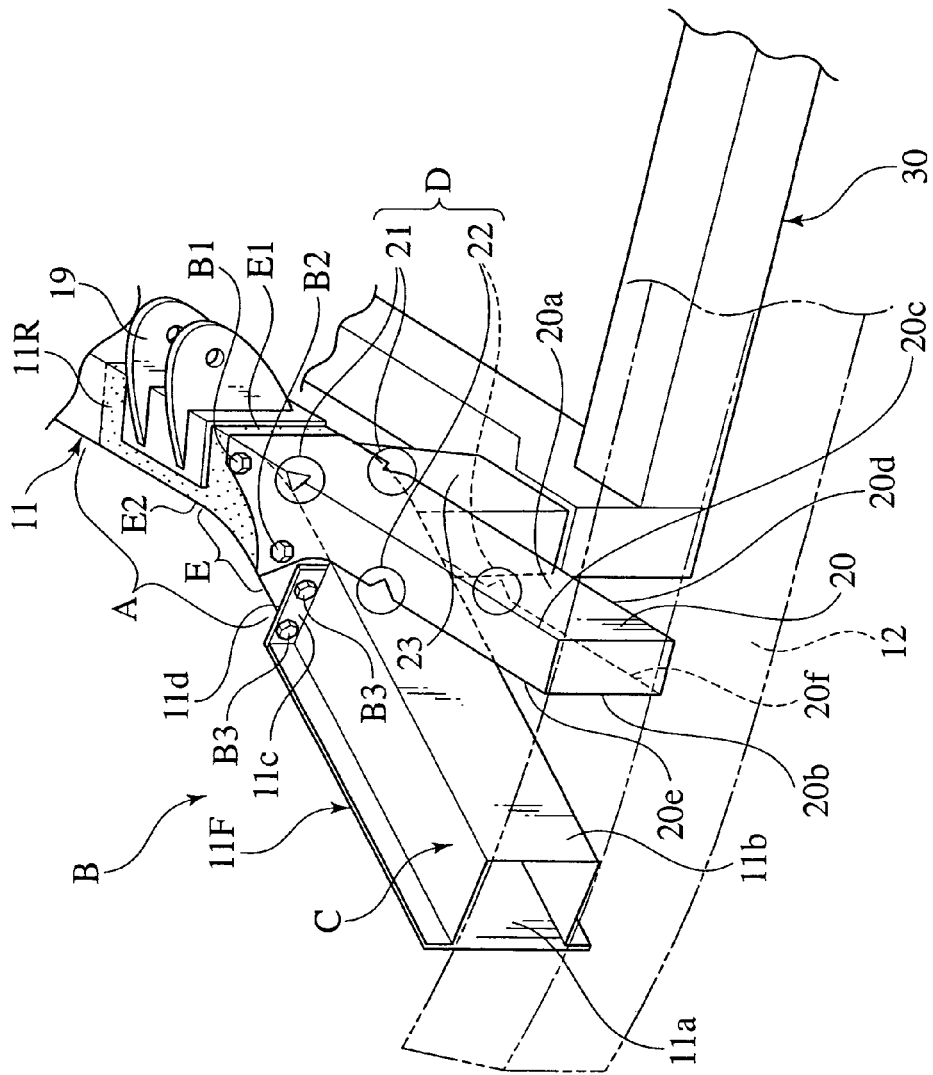
FIG. 4 is an enlarged perspective view of the skeletal structure of the front part on the right side of the vehicle body, in accordance with the first embodiment of the invention.
Figure 5:
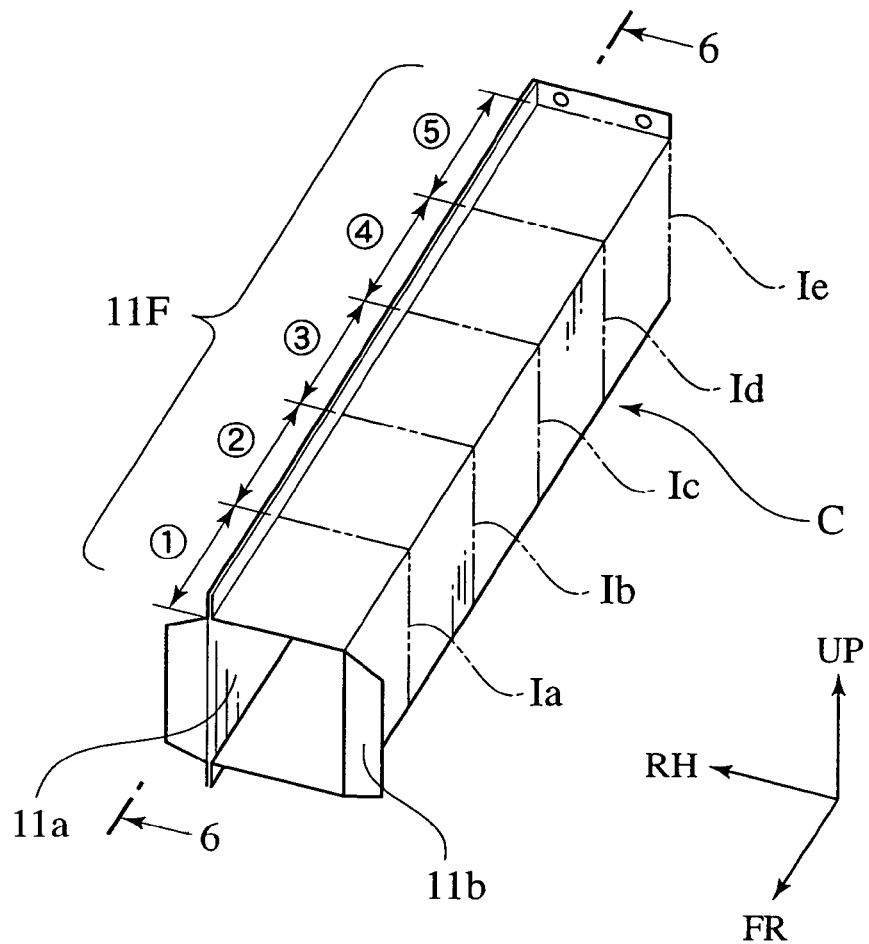
FIG. 5 is an enlarged perspective view of the front area of a side member, in accordance with the first embodiment of the invention.

That is, as shown in FIG. 4, the side-member front area 11F in front of the reinforcing part A of the side member 11 is inclined outwardly in the width direction (inclination angle: θ) as directing ahead of the vehicle 10. As shown in FIG. 5, the "out-directing" front area 11F is provided with a strength control mechanism C that establishes a relationship in strength that a maximum stress generated at each front of imaginary sections Ia, Ib, Ic . . . , Ie succeeding in the longitudinal direction of the area 11F is more than or close to a maximum stress generated at each rear of the same sections Ia, Ib, Ic . . . , Ie. (Front≧, Rear).

Further, as shown in FIGS. 3 and 4, each of the sub-side members 20 is arranged so as to extend from the vicinity of a continuous base 11Fb of the front area 11F to the front of the vehicle 10, substantially straight to an extension of a side-member rear area 11R. The front ends of the sub-side members 20 are connected to the rear face of the bumper reinforcement 12. Each sub-side member 20 is provided with a deformation mode control mechanism D that allows the sub-side member 20 to be bent inwardly in the width direction by the collision input F, thereby causing the member's interference with the power unit P.

As shown in FIGS. 4 and 5, the above side-member front area 11F is formed to have a closed section. The closed section is provided by fixing a first plate 11a in the form of a flat plate to respective flanges on both sides of a second plate 11b having a U-shaped section by means of spot welding etc.

Figure 6:
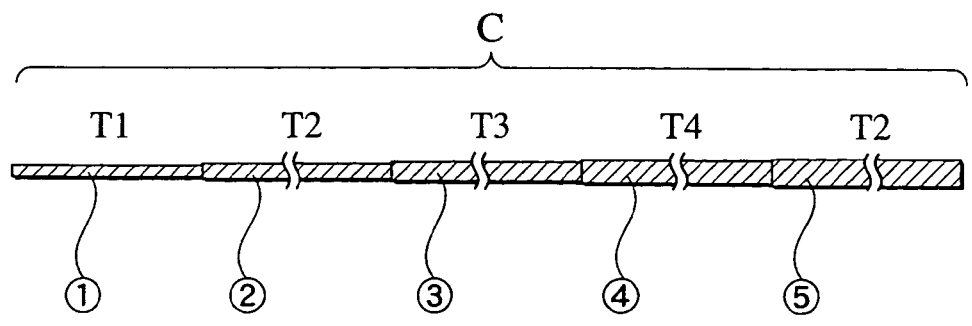
FIG. 6 is an enlarged sectional view taken along a line 6—6 of FIG. 5.

The strength control mechanism C is provided by altering the plate-thickness distribution of the front area 11F in the longitudinal direction. In detail, as shown in FIG. 6, the strength control mechanism C is formed by a composite panel member. This composite panel member can be obtained by welding the whole circumferences of a plurality of plate materials 1, 2, 3, 4 and 5 having respective thicknesses T1, T2 T3 . . . , and T5 changing in a step manner (T1<T2<T3<T4<T5), to each other in this order from the front end of the front area 11F, as shown in FIG. 5. As a result, the plate material 5 nearest to the reinforcing part A has the largest thickness of these plate materials.

Figure 7A:
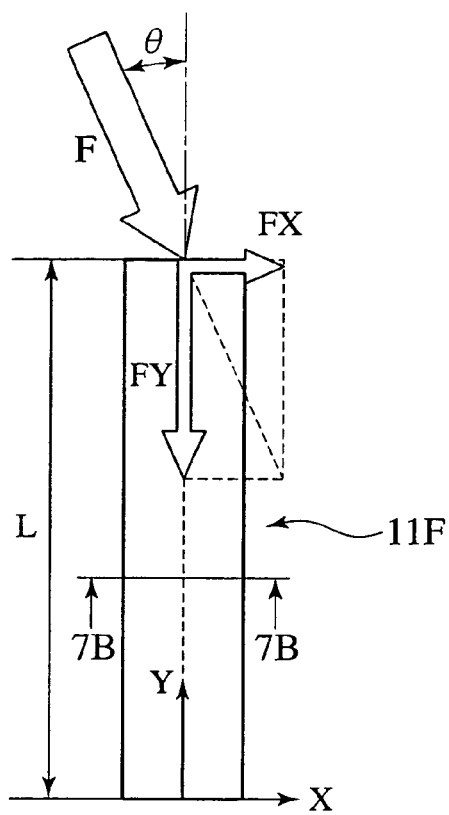
FIG. 7A is a view explaining a strength control mechanism of the first embodiment, in the form of an input model.
Figure 7B:
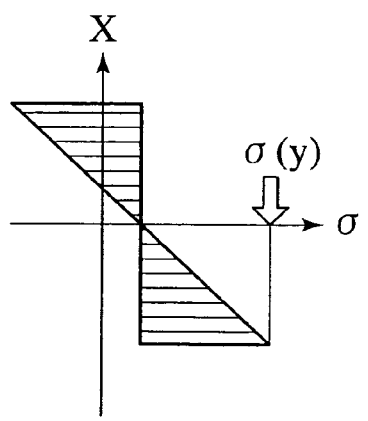
FIG. 7B is a view explaining the stress distribution about the strength control mechanism.

As for the side-member front area 11F, there is established a relationship by the following expression (1) when a front collision load F is applied on the front end of the area 11F statically, as shown in FIGS. 7A and 7B.

$$\sigma(y)=\{FY/A(y)\}+\{FX\times(L-y)\}/Z(y) \quad (1)$$

In the expression (1), the term "FY/A(y)" represents a stress in the axial force component, generated at each imaginary section Ia, Ib, . . . , Ie (see FIG. 5) when the front collision load F is applied on the front end of the area 11F statically. While, the term "FX×(L−y)}/Z(y)" represent a stress in the moment component, generated at each imaginary section Ia, Ib, . . . , Ie in the above situation. Further, the term "σ(y)" represents a yield strength of constituents of the side member.

According to the embodiment, as for a maximum of the sum of the "axial-force component" stress and the "moment component" stress, the maximum at the front part of each imaginary section is set to be nearly equal to the maximum at the rear part of the same imaginary section. Additionally, the upper limit of the maximum sum is set to be a yield strength σ(y) of constituents of the side member.

Figure 8:
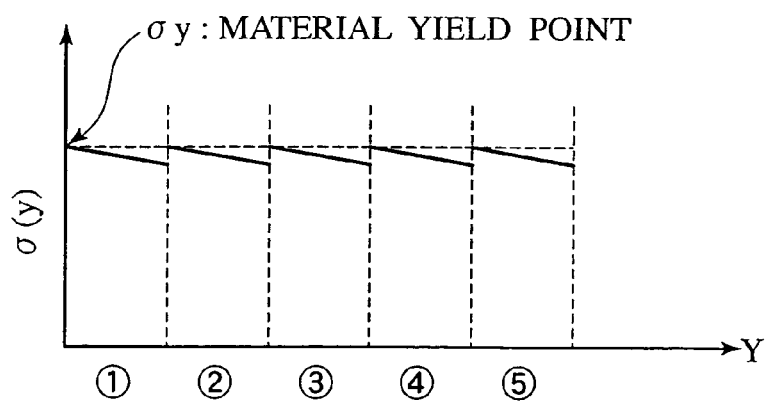
FIG. 8 is a stress distribution diagram showing a concept of the stress distribution about the strength control mechanism of the first embodiment.

Then, the upper limits in the maximum stress of the variable thickness portions of the front area 11F are respectively established on the standard of the above yield strengths of the constituents of the side member 11. Consequently, there can be obtained a distribution of yield stress σ(y) for the plate materials 1, 2, 3, 4 and 5, as shown in FIG. 8.

The reinforcing part A is positioned at the front end of the side-member rear area 11R. In the reinforcing part A, a curved part E is formed to incline toward the outside in the width direction. The side-member front area 11F is separated from the front end of the curved part E by a plane perpendicular to the longitudinal direction of the area 11F. As for this separation, the front area 11F is detachably joined to the curved part E. The rear end of the sub-side member 20 is detachably joined to the curved part E by first and second bolts B1, B2.

Flanges 11c, 11d are formed on the top and bottom sides of partition faces between the side-member front area 11F and the curved part E, respectively. These flanges 11c, 11d are fixed with each other by a plurality of bolts B3.

The front end of the side-member front area 11F is detachably joined to the bumper reinforcement 12 through not-shown detachable fastening elements, such as bolts. While, the front end of the sub-side member 20 is integrally fixed to the bumper reinforcement 12 by continuous welding etc. The rear end of the sub-side member 20 is detachably joined to a connecting part between the side-member front area 11F and the side-member rear area 11R, that is, the above curved part E, through first and second bolts B1, B2.

The first bolt B1 penetrates the rear portion of the curved part E up and down, in the vicinity of its inside face E1 in the width direction of the vehicle, while the second bolt B2 penetrates the front portion of the curved part E up and down, in the vicinity of its outside face E2 in the width direction of the vehicle.

As shown in FIG. 4, the deformation-mode control mechanism D is formed by first notches 21 and second notches 22. The first notches 21 are arranged, near the rear end of the sub-side member 20, on its upper and lower inside ridges 20c, 20d in the width direction, respectively. The second notches 22 are arranged on upper and lower outside ridges 20e, 20f of the sub-side member 20, each at a predetermined distance DX (see FIG. 3) from the first notch 21 forwardly, respectively.

As shown in FIG. 3, the distance DX is more than a clearance DY between an inside face 20a of the sub-side member 20 and a side face of the power unit P facing the inside face 20a.

The power unit P is supported by the mount brackets 19 each provided in the reinforcing part A of the side member 11. Additionally, as shown in FIG. 4, the power unit P is supported by a pair of attachment members 23 each extending from the bottom of the curved part E perpendicularly and a sub-frame 30 connected with the left and right extension side members 15 at two positions and with the attachment members 23 at two positions.

The rectangular-shaped sub-frame 30 is formed by a pair of side members 31 below and along the side members 11, a front member 32 connected with respective front ends of the side members 31 and a rear member 33 connected with the rear ends of the side members 31. In assembly, the front ends of the side members 31 are joined to the attachment members 23 respectively. The left and right extension side members 15 are joined to extensions 34 each extending from the rear end of the side member 31 backward and obliquely outside.

Figure 10:
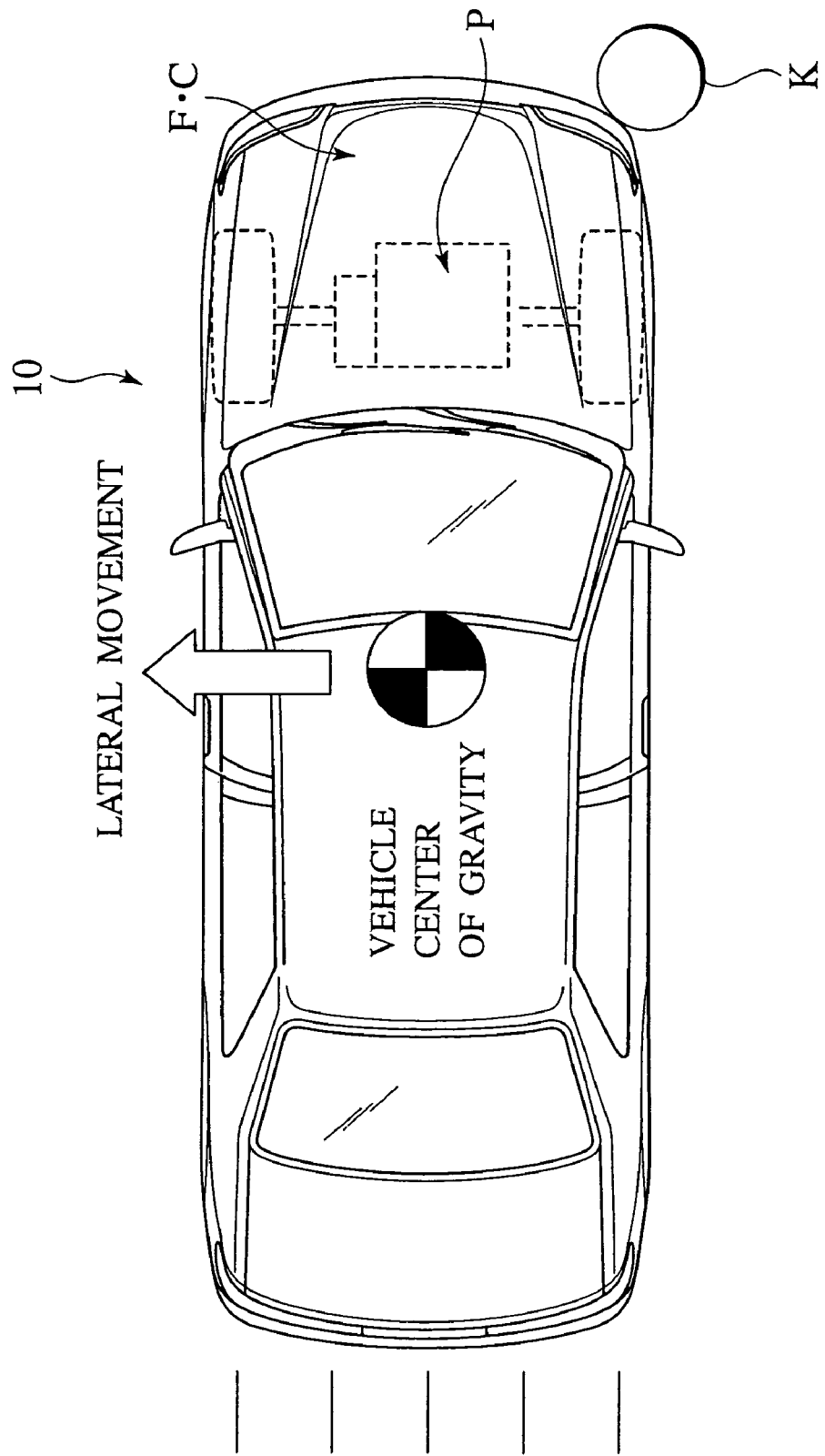
FIG. 10 is a plan view showing the displacement image of a vehicle rigid body at the small-overlap collision, in accordance with the first embodiment of the invention.

According to the front body structure of this embodiment, owing to the provision of the impact load transfer mechanisms B, when a collision input directed rearwardly of a vehicle is applied on the lateral side of a vehicle front end (e.g. an input F at a "small-overlap" collision causing an input face to concentrate in the lateral side of the vehicle—see FIG. 9), it is possible to convert the collision input F to lateral force Fy1, Fy2 directed inwardly in the width direction of the vehicle and also possible to directly transmit the lateral forces Fy1, Fy2 to various skeletal members in the front compartment FC, for example, the power unit P, the side members 11, the extension side members 15, etc. Therefore, as shown in FIG. 10, it is possible to induce and promote a lateral displacement of a vehicle rigid body.

Consequently, the vehicle body 10 is capable of forward movement while departing from a collision object K (e.g. pole on the shoulder of a road) sideways, thereby enhancing an effect to reduce the deformation of the vehicle body at a "small-overlap" collision. In brief, by inducing and promoting the lateral displacement of a vehicle rigid body by making use of an input of a "small-overlap" collision in the fore-and-aft direction of the vehicle, it is possible to reduce the deformation amount of the vehicle body 10.

Repeatedly, the impact load transfer mechanisms B each comprises the side-member front area 11F inclined outwardly and the sub-side member 20 adapted to be positively deformable at a vehicle collision. With the constitution, the impact load transfer mechanism B is capable of receiving an input F of a "small-overlap" collision shown in FIG. 9 through the front end of the "out-opened" side-member front area 11F directly.

As mentioned above, the side-member front area 11F is provided with the strength control mechanism C establishing a relationship such that the maximum stress at the front part of each of the imaginary sections Ia, Ib, . . . Ie (FIG. 5) is more than or nearly equal to the maximum stress at the rear part of the same imaginary section. Therefore, when the side-member front area 11F is subjected, at a "small-overlap" collision, to a collision input in parallel with the fore-and-aft direction of the vehicle, the side-member front area 11F allows an axial collapse Cr to be induced from the front end (as a collision input point) and the axial collapse Cr to be continuously transmitted backward without being folded at the base part joined to the curved part E. Thus, it is possible to absorb a collision energy effectively.

Further, owing to the forward-and-outward inclination of the side-member front area 11F, it is possible to transmit an input F from the front backward in the form of an oblique force directed inwardly and rearwardly of the vehicle at a "small-overlap" collision, allowing a lateral force Fy1 to act on the skeletal members in the rear and the sub-frame 30.

Then, since the rear end of the side-member front area 11F forming the strength control mechanism C is close to the reinforcing part A for reinforcing the mount bracket 19 and additionally, the attachment member 23 for the sub-frame 30 is formed below the curved part E, it is possible to reduce reinforcements about the area 11F in order to stabilize its deformation mode while improving the strength of the curved part E.

In the strength control mechanism C, the maximum-stress distribution of the imaginary sections Ia, Ib, . . . Ie (see FIG. 5) under the action of an axial input F has a stress at each front part of the sections larger than that at each rear part of the same section. Therefore, in case of an axial input only, namely, when a vehicle has a collision from its outside obliquely, it goes without saying that a deformation of the side member is induced from its front end and thereafter, the deformation is continuously transmitted backward, whereby it is possible to absorb a collision energy certainly. In other words, irrespective of variations in terms of both overlapping ratio and input angle about the collision, it is possible to absorb the collision energy stably.

Meanwhile, as for the sub-side member 20 extending from the vicinity of the continuous base 11Fb of the front area 11F to the front of the vehicle 10, substantially straight to the extension of the side-member rear area 11R, the deformation-mode control mechanism D allows the sub-side member 20 to be deformed inwardly in the width direction by the above collision input F, thereby interfering with the power unit P.

As shown in FIG. 4, repeatedly, the deformation-mode control mechanism D is formed by the first notches 21 respectively arranged, near the rear end of the sub-side member 20, on the upper and lower inside ridges 20c, 20d in the width direction of the vehicle and the second notches 22 respectively arranged on the upper and lower outside ridges 20e, 20f of the sub-side member 20, each at a predetermined distance DX (see FIG. 3) from the first notch 21 forwardly, that is, a distance more than the clearance DY between the inside face 20a of the sub-side member 20 and the power unit P. Therefore, as shown in FIG. 9, the collision input F causes the front end of the sub-side member 20 to be folded in chevron outwardly in the width direction about the second notches 22 as outer fulcrums while causing the sub-side member 20 to be folded inwardly in the width direction about the first notches 21 as inner fulcrums, so that the sub-side member 20 as a whole is folded in a substantial-V shaped manner.

Consequently, the chevron-shaped peak part 22a bent about the second notches 22 as the fulcrums butts against the front side of the power unit P backward obliquely, so that the sub-side member 20 functions as a strut member between the interference part of the peak part 22a and a front side face Pf of the power unit P.

Accordingly, it is possible to convert an input F at a small-overlap collision to a force to depress the power unit P backward obliquely, thereby generating a lateral force Fy2 directed inwardly in the width direction from part of the input in the fore-and-aft direction of the vehicle. As a result, together with a lateral force Fy1 by the side member 11, it is possible to apply lateral forces Fy1, Fy2 on the rigid skeletal members (e.g. the side member 11, the sub-frame 30, etc.) and rigid components of the power unit P at the small-overlap collision.

Figure 11:
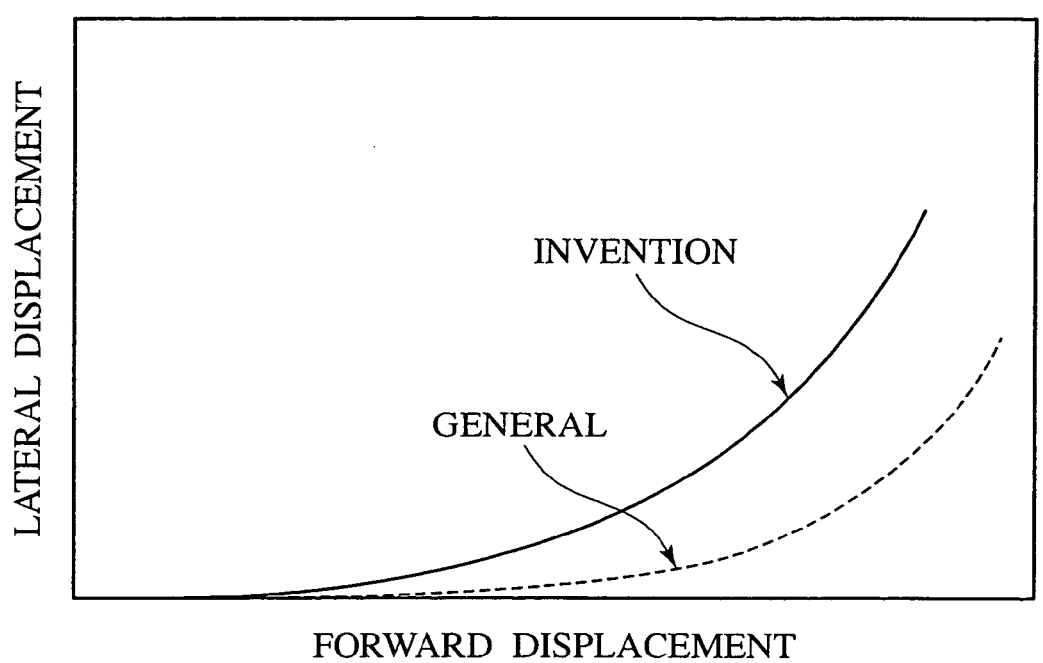
FIG. 11 is a graph showing the relationship between the front displacement of a vehicle center of gravity and its lateral displacement at the small-overlap collision, comparing the first embodiment of the invention with a conventional mechanism.

Thus, as shown in FIG. 11, the vehicle 10 provided with the impact load transfer mechanism B of this embodiment can gain a large lateral displacement in relation to the forward displacement in comparison with general vehicle structures, thereby allowing the vehicle to move forwardly while greatly departing from the collision object K in the lateral direction. Therefore, as a result of inducing and promoting the lateral movements of the vehicle rigid body by making use of the input F in the fore-and-aft direction at the small-overlap collision, it is possible to suppress the deformation of the vehicle body 10 effectively.

In addition to the above effects, it is noted that the front end of each side-member front area 11F is detachably connected with the bumper reinforcement 12 through detachable fastening members, while the front end of each sub-side member 20 is fixed with the bumper reinforcement 12 integrally by means of continuous welding etc. and the rear end of the sub-side member 20 is detachably joined to the curved part E between the front area 11F and the rear area 11R through the first and second bolts B1, B2. Therefore, owing to the provision of the sub-side members 20 and the bumper reinforcement 12 in the form of one module structure, it is possible to improve the productivity of the front body structure.

Further noted that the side-member front area 11F is separated from the front end of the curved part E by a plane perpendicular to the longitudinal direction. As for this separation, the front area 11F is detachably joined to the curved part B through the plural bolts B3. Further, the rear end of the sub-side member 20 is also detachably connected with the curved part E through two bolts B1, B2. Therefore, it is possible to provide the portion of the side member 11 in front of the curved part E in the form of "front-end" module structure, it is possible to improve the repairing capability at a light collision (at a low speed) that cause a light damage on the skeletal members, in addition to the improvement in productivity.

In these bolts B1, B2, furthermore, since the first bolt B1 penetrates the rear portion of the curved part E up and down, in the vicinity of its inside face E1 in the width direction of the vehicle and the second bolt B2 penetrates the front portion of the curved part E up and down, in the vicinity of its outside face E2 in the width direction of the vehicle, when the input F causes the sub-side member 20 to be bent from the first notches 21 and the second notches 22, there is generated, about the first bolt B1 as the center axis, a moment M to jerk the second bolt B2 inwardly of the vehicle, as shown in FIG. 9.

Consequently, as the above moment M serves to cancel a part of moment generated in the curved part E to bend the side member 11 outside, it becomes possible to reduce a strength required for the curved part E, whereby the reinforcement for the part E can be alleviated to attain the weight saving of the front body structure.

Figure 12:
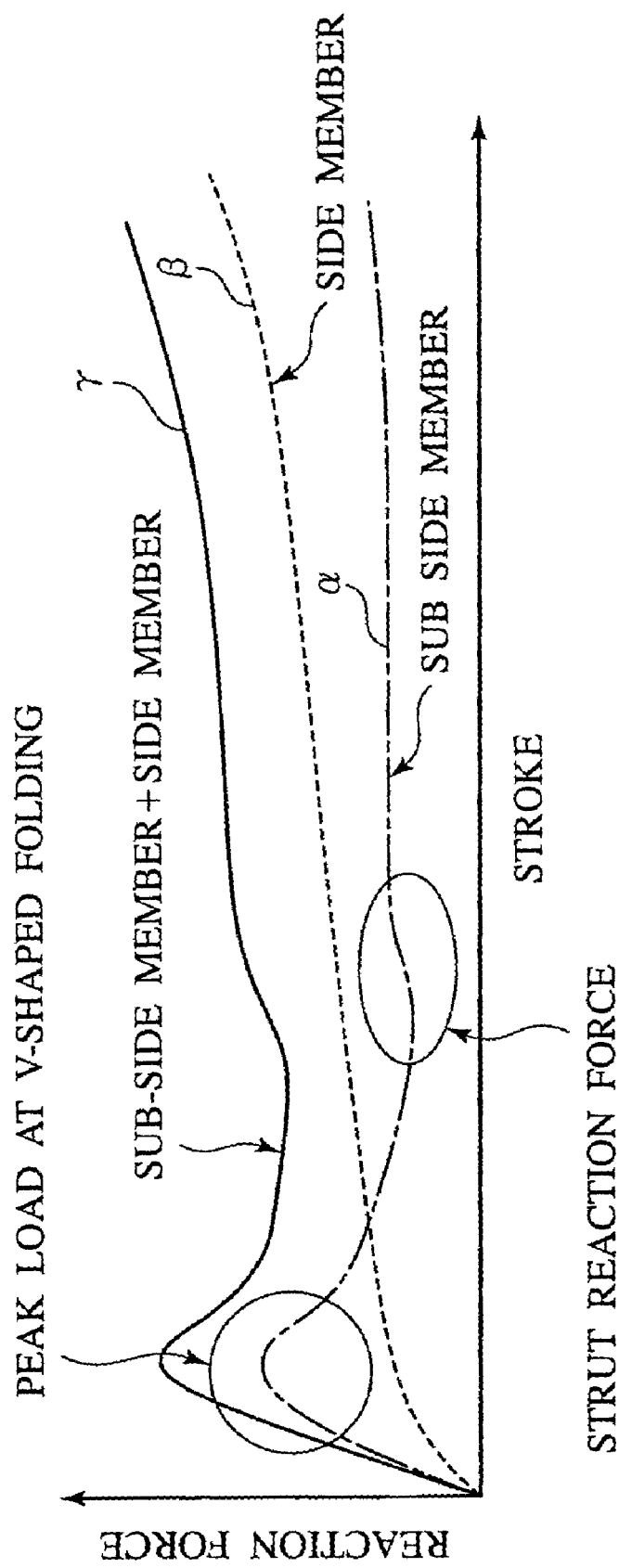
FIG. 12 is a graph of the reaction-force characteristic image showing the relationship between reaction force and collapsing stroke in a side member, a sub-side member and a combination thereof, in accordance with the first embodiment of the invention.

Then, since the deformation mode of the sub-side member 20 belongs to a kind of folding, the characteristic of reaction force exhibits a characteristic curve α close to a triangular wave, as shown in FIG. 12. As a result of combining this characteristic of the sub-side member 20 with that of the side-member front area 11F shown with a gradually-rising curve β, it is possible to establish an energy-absorbing structure provided with the "reaction-force" characteristic shown with a curve γ close to a rectangular wave.

Again, owing to the structure of the deformation-mode control mechanism D having the first notches 21 on the upper/lower inside ridges 20c, 20d and the second notches 22 on the upper/lower inside ridges 20e, 20f apart from the first notches 21 each in a predetermined distance DX, it is possible to fold each sub-side member 20 to a target shape stably. Further, if adjusting respective widths and depths of the first/second notches 21, then it is possible to control a peak load of the sub-side member 20.

Consequently, as shown in FIG. 12, it is possible to bring the "reaction-force" characteristic γ as a result of cooperating with that of the side member 11, close to the characteristic as originally designed.

Additionally, since the sub-frame 30 is connected to the vicinities of respective supporting points of the skeletal members, such as the side members 11 mounting the power unit P and the rear extension members 15, it is possible to transmit a lateral force Fy1 from one side member 11 to the skeletal members on the front side of the vehicle (e.g. the opposite side member 11, the rear extension members 15, etc.) certainly and stably. Further, owing to the provision of the attachment members 23 for the sub-frame 30 on the bottoms of the curved parts E, it is possible to alleviate the reinforcement for the side members 11 for their stabilization in deformation mode while improving the strength of the curved parts E.

The above-mentioned operations and effects will be summarizes as follows.

Owing to the provision of the impact load transfer mechanism that directly transmits an oblique force directed inwardly and rearwardly of a vehicle to a power unit and skeletal members in a front compartment when a collision input directed rearward of the vehicle is applied on the lateral side of the vehicle front end, it is possible to induce and promote a lateral displacement of the vehicle rigid body at a "small-overlap" collision causing an input face to concentrate in the lateral side of the vehicle. Consequently, the vehicle body is capable of forward movement while departing from a collision object sideways, thereby reducing the deformation of the vehicle body at the small-overlap collision effectively. In brief, by inducing and promoting the lateral displacement of a vehicle rigid body by making use of the input of the small-overlap collision in the fore-and-aft direction of the vehicle, it is possible to induce and promote a lateral displacement of the vehicle rigid body and also possible to reduce the deformation amount of the vehicle body.

Since the front part of the side member in front of the reinforcing part for mounting an engine is inclined outwardly in the width direction while directing ahead of the vehicle, the front end of the side member can receive an input of the small-overlap collision where the input point concentrates in the lateral side of the vehicle, directly.

Owing to the provision of the strength control mechanism for each side member, which establishes a relationship such that the maximum stress at the front part of each of the imaginary sections succeeding in the longitudinal direction of the side member becomes more than or nearly equal to (front≧rear) the maximum stress at the rear part of the same imaginary section, when the front end of the side member is subjected, at a small-overlap collision, to a collision input in parallel with the fore-and-aft direction of the vehicle, the side member allows a deformation to be induced from the front end and the deformation to be continuously transmitted backward without being folded at the base part of the side member. As a result, it is possible to absorb a collision energy effectively. Further, at the small-overlap collision, owing to the forward-and-outward inclination of the side-member, it is possible to transmit an input from the front backward in the form of an oblique force directed inwardly and rearwardly of the vehicle and also possible to make a lateral force act on an engine mount and skeletal members in the rear. Noted that since the rear end of a side-member portion establishing the strength control mechanism is formed by the reinforcing part for mounting an engine, the utilization of features inherent in the reinforcing part allows the reinforcement for the side member to be alleviated, thereby progressing both rationalization and weight-saving of the front body structure.

Again, according to the strength control mechanism mentioned above, the maximum-stress distribution of the imaginary sections under the action of an axial input has a stress at each front part of the sections larger than that at each rear part of the same section. Therefore, in case of the axial input only, namely, when a vehicle has a collision from its outside obliquely, a deformation of the side member can be induced from its front end and thereafter, the deformation is continuously transmitted backward, whereby it is possible to absorb a collision energy certainly. In other words, irrespective of variations in terms of both overlapping ratio and input angle about the collision, it is possible to absorb the collision energy stably.

Further, owing to the provision of the above-mentioned deformation-mode control mechanism, at a small-overlap collision, the sub-side member is deformed so as to project inside of the vehicle in a V-shaped manner by a collision input via the bumper reinforcement. Consequently, the deformation-peak of the sub-side member bumps against the front face of the power unit, so that the sub-side member functions as one strut member between the bumper reinforcement and the front face of the power unit. That is, by converting an input at a small-overlap collision to a force to directly press the power unit obliquely, it is possible to transmit a part of input in the fore-and-aft direction to the power unit directly, as a lateral force. Consequently, in cooperation with the side member, it is possible to induce and promote a lateral displacement of the vehicle rigid body, whereby the deformation amount of the vehicle body can be reduced at a small-overlap collision.

Since the deformation mode of the sub-side member resides in folding, the characteristic of reaction force exhibits a characteristic close to a triangular wave. Therefore in combination with the side member having a gradually-increased reaction force, it is possible to establish an energy-absorbing structure provided with the "reaction-force" characteristic close to a rectangular wave.

The front end of the side member is detachably joined to the bumper reinforcement through detachable fastening elements, such as bolts. While, the front end of the sub-side member is integrally fixed to the bumper reinforcement by continuous welding etc. The rear end of the sub-side member is detachably joined to the vicinity of the curved part through detachable fastening elements, such as bolts. Therefore, it is possible to provide both of the sub-side members and the bumper reinforcement in the form of one module structure, thereby improving the productivity of the front body structure.

Further, the side member is divided, near the front end of the curved part inclined outwardly, into front and rear parts by a plane perpendicular to the longitudinal direction of the curved part. As for this separation, the resulting front part of the side member is detachably joined to the rear part curved part through detachable fastening elements, such as bolts. Further, the rear end of the sub-side member is also detachably connected with the curved part through detachable fastening elements, such as bolts. Therefore, it is possible to provide part of the side member in front of the curved part in the form of a "front-end" module structure, thereby improving the repairing capability against a light collision at a low speed in addition to the improved productivity.

The sub-side member is connected, near the front end of the curved part inclined outwardly of the side member, with the side member by two bolts penetrating the curved part up and down. In these bolts, one bolt penetrates the rear portion of the curved part up and down, in the vicinity of the inside face of the curved part in the width direction of the vehicle. The other bolt penetrates the front portion of the curved part up and down, in the vicinity of the outside face of the curved part in the width direction of the vehicle. Consequently, when an input from the front causes the sub-side member to be folded in a V-shaped manner, a moment to jerk the front bolt inwardly of the vehicle is produced about the rear bolt as the center axis. Thus, as this moment serves to cancel a part of moment generated in the curved part to fold the side member outwardly, the reinforcement for the curved part can be alleviated to attain the weight saving of the front body structure.

The deformation-mode control mechanism of the sub-side member is formed by the first notches on the upper/lower inside ridges near the rear end of the sub-side member and the second notches on the upper/lower inside ridges apart from the first notches each by a distance more than a clearance between the inside face of the sub-side member and the side face of the power unit, it is possible to induce the stable V-shaped deformation for the sub-side member. Further, if adjusting respective widths and depths of the first/second notches, then it is possible to control a peak load about the sub-side member. Consequently, it is possible to bring the "reaction-force" characteristic, which comes nearest to a rectangular wave as a result of cooperating with the side member, close to the characteristic as originally designed.

Figure 13:
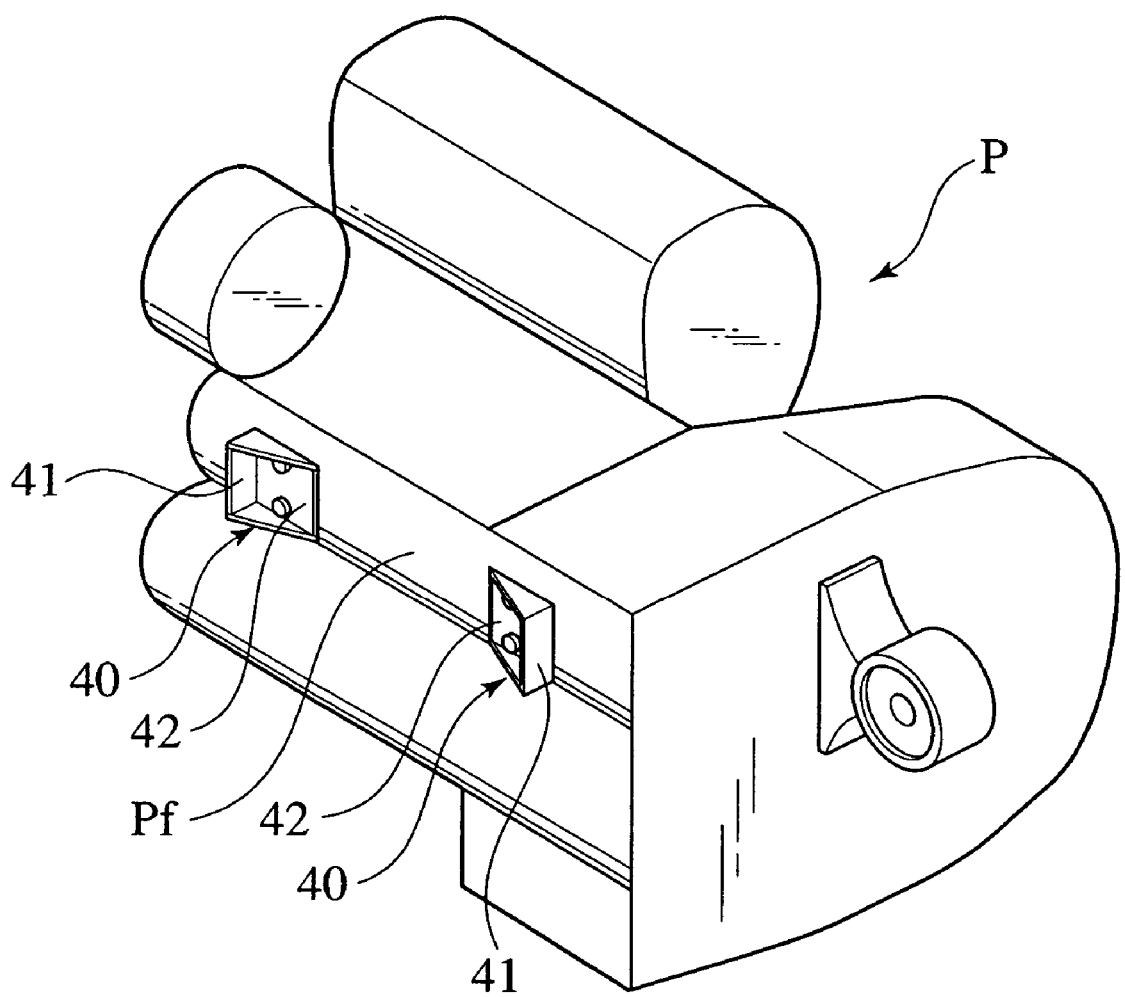
FIG. 13 is a perspective view of a power unit in accordance with the second embodiment of the invention.
Figure 14:
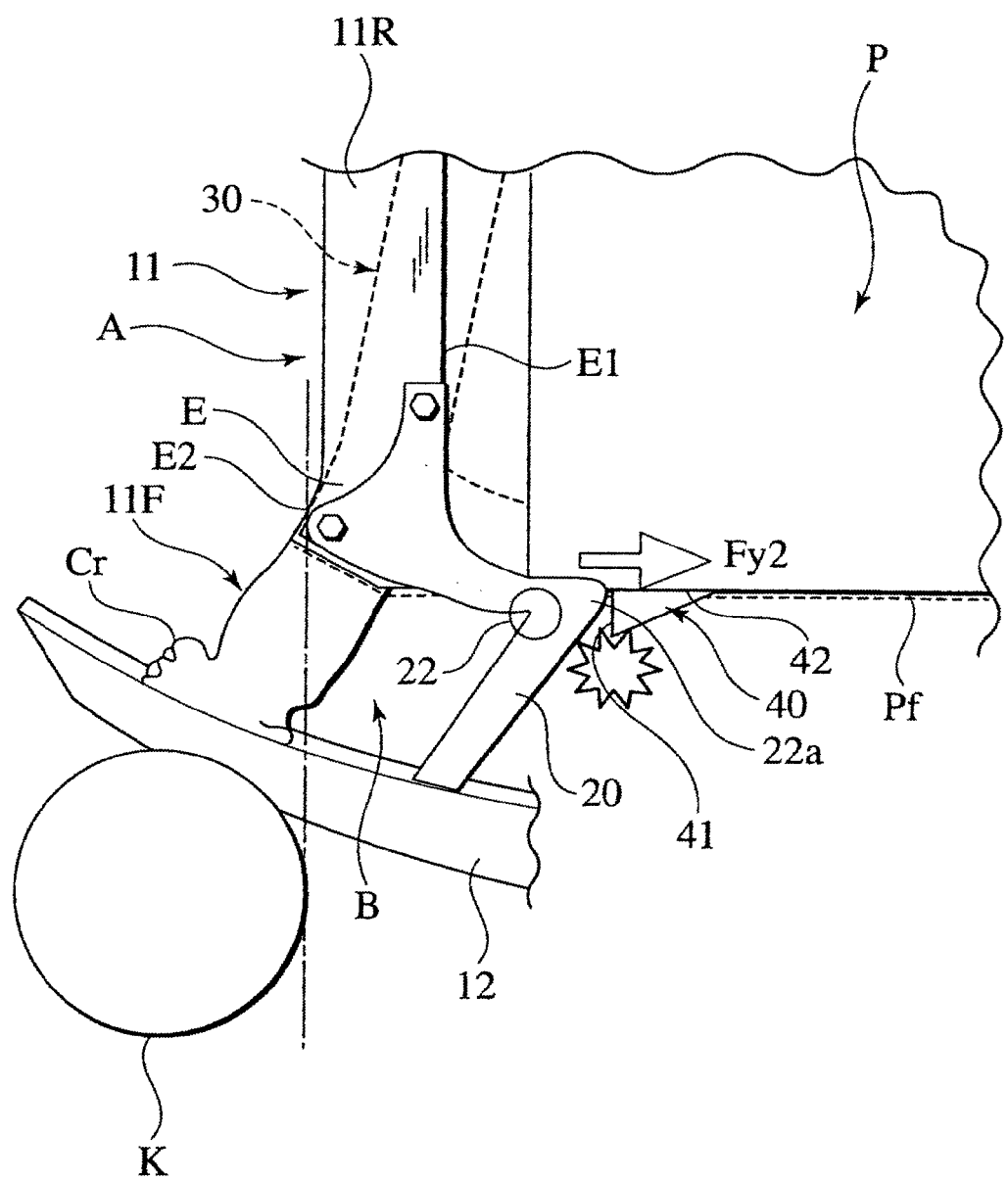
FIG. 14 is a schematic plan view showing the deformation mode of the front part on the right side of the vehicle body at the small-overlap collision, in accordance with the second embodiment of the invention.

FIGS. 13 and 14 show the second embodiment of the present invention. In the second embodiment, elements similar to those of the first embodiment are indicated with the same reference numerals respectively and their overlapping descriptions are eliminated.

FIG. 13 is a perspective view of the power unit. FIG. 14 is a schematic plan view showing the deformation mode of the front part on the right side of the vehicle body at a small-overlap collision. In the front body structure of the second embodiment, the power unit P is provided with projections 40 each of which engages with a peak part 22a of the folding deformation when the sub-side member 20 is folded inwardly in the width direction of the vehicle due to a vehicle collision.

Each of the projections 40 is formed to have a L-shaped section and includes an abutting face 41 directing outwardly to interfere with the peak part 22a and an attachment face 42 fitted to the power unit P by means of bolts. The projections 40 are fixed on both sides of a front face Pf of the power unit P while directing the abutting faces 41 outwardly in the width direction of the vehicle.

The abutting face 41 is formed with a predetermined length in the vertical direction so as to enable reliable engagement with the peak part 22a in spite of its variations in the vertical position due to the deforming state at a collision.

In addition to the effects similar to those of the first embodiment, according to the second embodiment, when the peak part 22a interferes with the front face Pf of the power unit P since a small-overlap collision causes the sub-side member 20 to be folded by the deformation-mode control mechanism D, the peak part 22a engages with the abutting face of the projection 41. Then, since the peak part 22a is prevented from slipping sideways, the sub-side member 20 can exhibit a function as one strut member certainly, allowing a lateral force Fy2 to be transmitted to the power unit P certainly.

Figure 15:
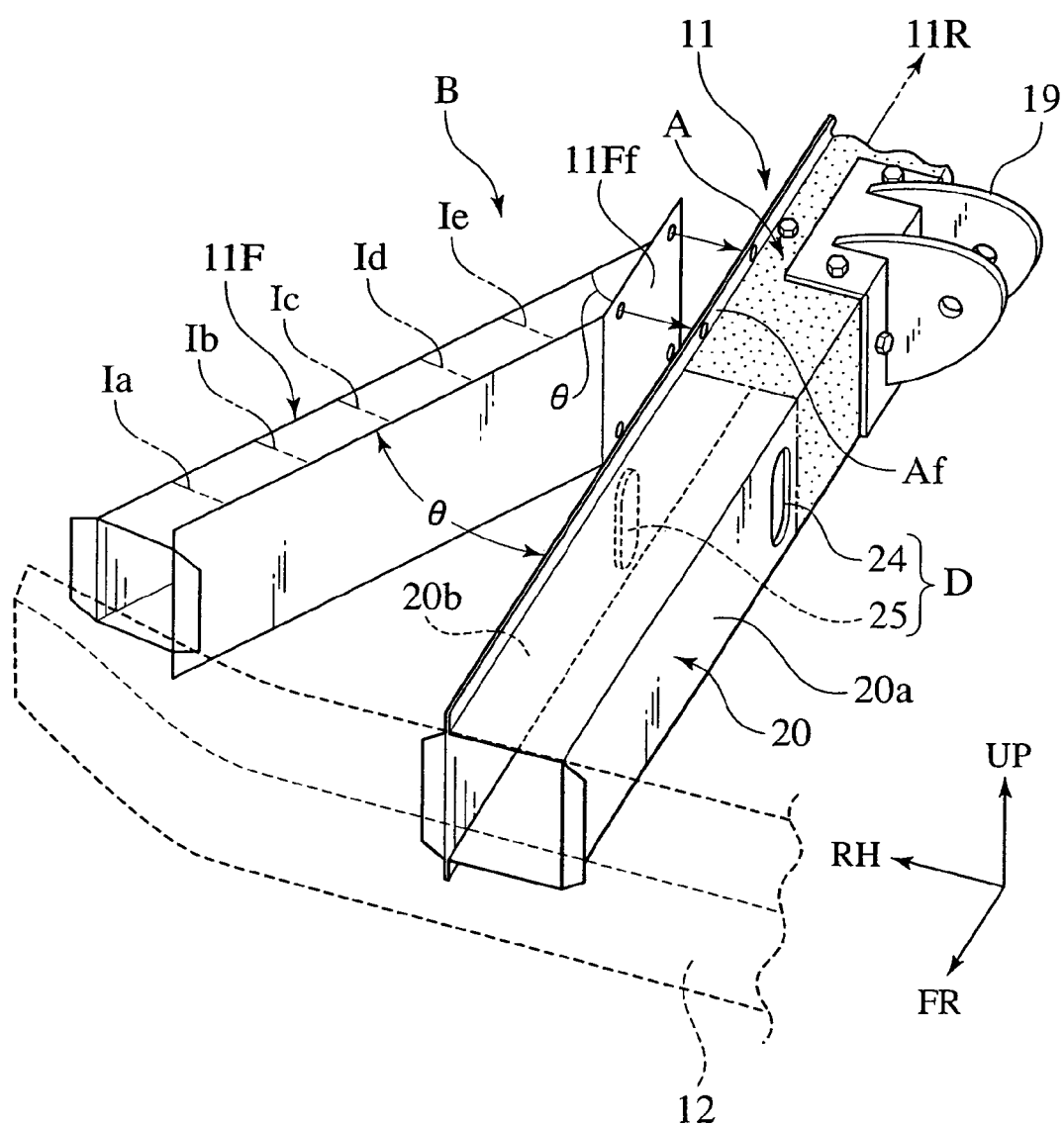
FIG. 15 is an enlarged perspective view of the skeletal structure of the front part on the right side of the vehicle body, in accordance with the third embodiment of the invention.

FIG. 15 shows the third embodiment of the present invention. In the third embodiment, elements similar to those of the first embodiment are indicated with the same reference numerals respectively and their overlapping descriptions are eliminated.

FIG. 15 is an enlarged perspective view of the skeletal structure of the front part on the right side of the vehicle body. According to the third embodiment, the side-member front area 11F and the side-member rear area 11R are separable from each other. The rear end of the side-member front area 11F is detachably connected with the reinforcing part A for the side member 11, while the sub-side member 20 is formed in one body with the side-member rear area 11R continuously.

The side-member front area 11F is provided, at the rear end, with a flange 11Ff whose both sides of upper/lower portions are joined to upper and lower flanges Af of the reinforcing part A through bolts, nuts, etc.

The flange 11Ff is slanted to the side-member front area 11F with an inclination angle θ. Thus, when the flange 11Ff is joined to the reinforcing part A, the side-member front area 11F is inclined outwardly in the width direction of the vehicle with the predetermined angle θ.

The deformation-mode control mechanism D for each sub-side member 20 is formed by a third vertical notch 24 formed on the inside face 20a of the member 20 to swell outwardly in the width direction of the vehicle and a fourth vertical notch 25 formed on the outside face 20b of the member 20 to swell inwardly in the width direction. The fourth notch 25 is positioned ahead of the third notch 24 in a predetermined distance DX.

Also in this embodiment, the above distance DX is more than a clearance DY (see FIG. 3) between the inside face 20a and the side face of the power unit P, as similar to the first embodiment.

In addition to the effects of the first embodiment, owing to the above-mentioned relationship among the side-member front area 11F, the side-member rear area 11R and the sub-side member 20, that is, the structure obtained by adding the side-member front area 11F to the front part of the side member 11 serving as a sub-side member F, it is possible to reduce an alternation in design of this structure from the conventional vehicle structure, whereby the front body structure of this embodiment is applicable for broader kinds of vehicles.

Owing to the constitution of the deformation-mode control mechanism D, the collision input F (see FIG. 9) allows the sub-side member 20 to be folded in a substantial-V shaped manner stably, as similar to the first and second notches 21, 22 of the first embodiment.

Figure 16:
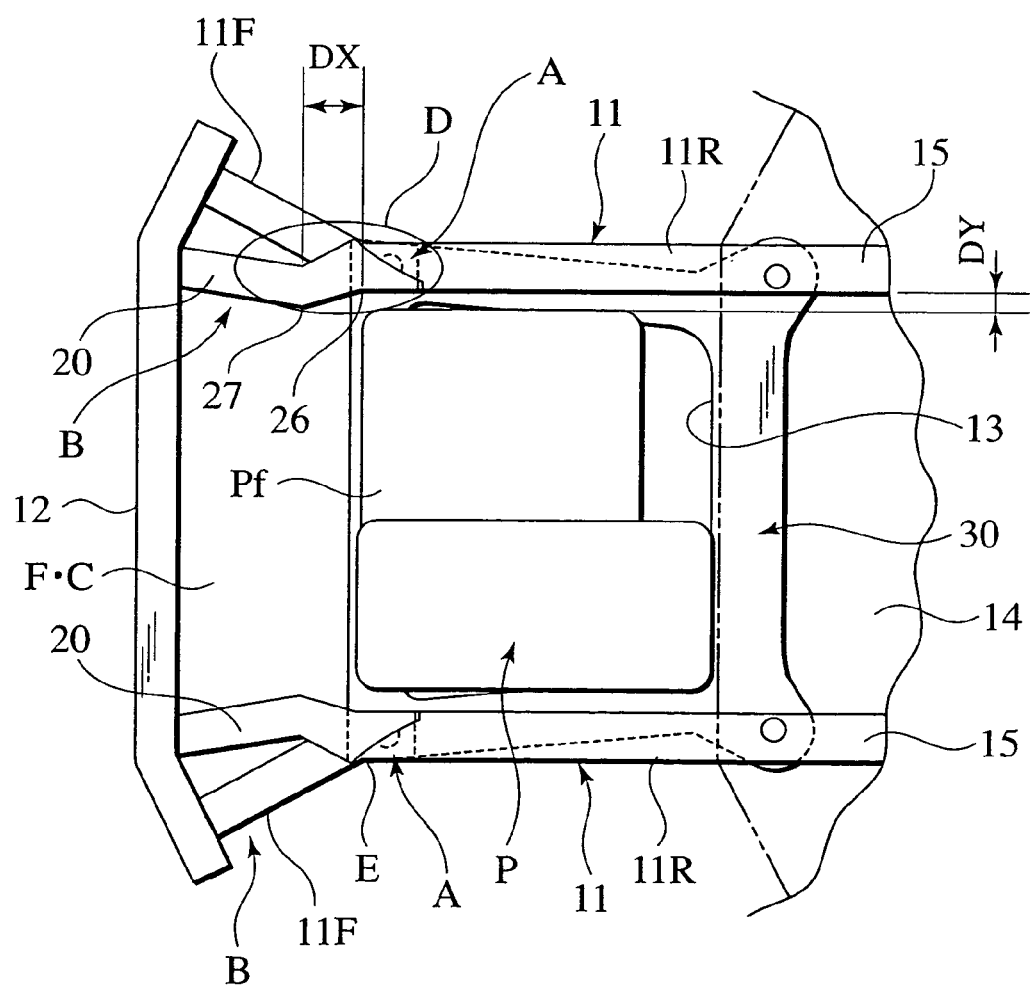
FIG. 16 is a schematic plan view of the skeletal structure of the front part of the vehicle body, in accordance with the fourth embodiment of the invention.

FIG. 16 shows the fourth embodiment of the present invention. In the fourth embodiment, elements similar to those of the first embodiment are indicated with the same reference numerals respectively and their overlapping descriptions are eliminated.

FIG. 16 is a schematic plan view showing the skeletal structure of the front part of a vehicle. In the front body structure, the deformation-mode control mechanism D is formed by the sub-side member 20 including a first inclined part 26 and a second inclined part 27 in succession to the part 26. The first inclined part 26 is inclined inwardly in the width direction of the vehicle. Further, the first inclined part 26 is formed to extend from the rear end of the sub-side member 20 forwardly by a predetermined distance DX. While, the second inclined part (continuous part) 27 is formed to be connected to the first inclined part 26 forwardly. Similarly, the second inclined part 27 is inclined outwardly in the width direction of the vehicle. In the modification, the continuous part 27 may be formed in parallel with the fore-and-aft direction of the vehicle.

Similarly to the deformation-mode control mechanism D of the first embodiment, the distance DX is more than a clearance DY between the inside face 20a of the sub-side member 20 and the power unit P, as shown in FIG. 16.

In addition to the effects of the first embodiment, owing to the provision of the deformation-mode control mechanism D formed by the inclined parts 26, 27 in the sub-side member 20, it is possible to induce a substantial-V shaped folding in the sub-side member 20 due to a collision input F (see FIG. 9). Further, the adjustment in respective inclination angles of the inclined parts 26, 27 allows the reaction-force characteristic of the sub-side member 20 to be controlled. Consequently, it is possible to bring the "reaction-force" characteristic γ (see FIG. 12), which comes nearest to a rectangular wave as a result of cooperating with the side member 11, close to the characteristic as originally designed.

The front body structure of the invention has been described by examples of the first embodiment to the fourth embodiment. Besides these embodiments, various changes and modifications may be made to the present invention without departing from the spirit of the invention.

According to the present invention, through the load transmitting mechanism, it is possible to transmit a collision input (e.g. collision input at a "small-overlap" collision causing an input face to concentrate in the lateral side of the vehicle), which has been applied on the lateral side of a vehicle front end to direct to rearward of a vehicle, to a power unit and vehicle skeletal members in a front compartment. Thus, it is possible to move the vehicle body forwardly while departing from a collision object sideways.

As a result, it is possible to enhance an effect to reduce the deformation of a vehicle body at a small-overlap collision. That is, by making use of an input in the fore-and-aft direction of the vehicle at the small-overlap collision, it is possible to induce and promote a lateral displacement of a vehicle rigid body, whereby the deformation amount of the vehicle body can be reduced.

Japanese Patent Application No. 2002-227863, filed on Aug. 5, 2002, is incorporated herein by reference in its entirety.

The scope of the invention is defined with reference to the following claims.

What is claimed is:

1. A vehicle front body structure, comprising:
    a pair of longitudinal structural members;
    a front compartment formed inside the longitudinal structural members;
    a power unit connected to the longitudinal structural members and placed in the front compartment; and
    an impact load transfer mechanism formed outside the front compartment and changing an impact load direction to a lateral direction for transmitting an impact load to one of the longitudinal structural members and the power unit directly.

2. A vehicle front body structure, comprising:
    a pair of longitudinal structural members;
    a front compartment formed inside the longitudinal structural members
    a power unit connected to the longitudinal structural members and placed in the front compartment; and
    an impact load transfer mechanism formed outside the front compartment and changing an impact load direction to a lateral direction for transmitting an impact load to one of the longitudinal structural members and the power unit directly, wherein the longitudinal structural members comprise a pair of side members arranged on left and right sides of the front compartment to extend in the fore-and-aft direction of the vehicle, the side members each having a reinforcing part for mounting the power unit, wherein the vehicle front body structure further comprises a bumper reinforcement connected with the front ends of the side members to extend in the width direction of the vehicle, wherein the impact load transfer mechanism comprises:

a side-member front area arranged in front of each reinforcing part to incline outwardly in the width direction of the vehicle, the side-member front area being provided with a strength control mechanism that controls a strength of each side member so that the maximum stress generated in the front part of each one of sections arranged in the longitudinal direction of each side member becomes more than or close to the maximum stress generated in the rear part of the each one of the sections;

a sub-side member arranged so as to extend from each reinforcing part toward the front of the vehicle, substantially straight relative to an extension of a side-member rear area, the sub-side member connected to the bumper reinforcement at a front end, of the sub-side, member; and a deformation-mode control mechanism that allows the sub-side member to be deformed inwardly in the width direction of the vehicle due to the impact load, thereby to render the sub-side member interfered with the power unit.

3. The vehicle front body structure of claim 2, wherein the side-member front area has its front end detachably connected with the bumper reinforcement, while the sub-side member has its front end fixed with the bumper reinforcement integrally, and the sub-side member has its rear end detachably connected with a connecting part between the side-member front area and the side-member rear area.

4. The vehicle front body structure of claim 2, wherein the side-member front area is separately formed from the side-member rear area, while the rear end of the side-member front area is detachably connected with the side member rear area at the vicinity of the reinforcing part, and the sub-side member is integrally formed with the side-member rear area.

5. The vehicle front body structure of claim 2, wherein each reinforcing part at the front end of the side-member rear area has a curved part formed to incline outwardly in the width direction of the vehicle, the side-member front area is separated from the front end of the curved part by a plane perpendicular to the longitudinal direction of the curved part, the side-member front area is detachably connected to the curved part, and the rear end of the sub-side member is also detachably connected to the curved part.

6. The vehicle front body structure of claim 5, wherein the sub-side member is connected with the curved part by two bolts penetrating the curved part vertically, one of the two bolts is positioned in a rear part of the curved part, at a position close to the inside face of the curved part in the width direction of the vehicle, and the other one of the two bolts is positioned in a front part of the curved part, at a position close to the outside face of the curved part in the width direction of the vehicle.

7. The vehicle front body structure of claim 2, wherein the deformation-mode control mechanism includes:

first notches formed, in the vicinity of the rear end of the sub-side member, on upper and lower ridgelines thereof respectively, inside in the width direction of the vehicle; and second notches formed on upper and lower ridgelines of the sub-side member, outside in the width direction of the vehicle, the second notches being forwardly apart from the first notches at a predetermined distance each.

8. The vehicle front body structure of claim 2, wherein the deformation-mode control mechanism includes:

a third vertical notch formed, in the vicinity of the rear end of the sub-side member, on an inside face thereof in the width direction of the vehicle, the third notch swelling outwardly in the width direction of the vehicle; and a fourth vertical notch formed on an outside face of the sub-side member, in the width direction of the vehicle, the fourth vertical notch swelling inwardly in the width direction of the vehicle, the fourth vertical notch being forwardly apart from the third notch at a predetermined distance.

9. The vehicle front body structure of claim 2, wherein the deformation-mode control mechanism includes the sub-side member comprising:

an inclined part formed to incline inwardly in the width direction of the vehicle, the inclined part extending from the rear end of the sub-side member forwardly by a predetermined distance; and a continuous part formed to be connected to the inclined part forwardly, the continuous part being paralleled with the fore-and-aft direction of the vehicle or inclined outwardly in the width direction of the vehicle.

10. The vehicle front body structure of claim 2, wherein the power unit is provided with a projection that can engage with a deformation peak part of the sub-side member being folded inwardly in the width direction of the vehicle by a collision input.

11. The vehicle front body structure of claim 2, further comprising a sub-frame connected to each reinforcing the vicinities of supporting points of the longitudinal structural members mounting the power unit thereon.

12. A vehicle front body structure, comprising:

a pair of longitudinal structural members;

a front compartment formed inside the longitudinal structural members;

a power unit connected to the longitudinal structural members and placed in the front compartment; and impact load transfer means for changing an impact load direction to a lateral direction for transmitting an impact load to one of the longitudinal structural members and the power unit directly, the impact load transfer means formed outside the front compartment.

13. The vehicle front body structure of claim 1, wherein the longitudinal structural members comprise a pair of side members arranged on left and right sides of the front compartment to extend in the fore-and-aft direction of the vehicle, the side members each having a reinforcing part for mounting the power unit, wherein the vehicle front body structure further comprises a bumper reinforcement connected with the front ends of the side members to extend in the width direction of the vehicle, wherein the impact load transfer mechanism comprises:

a side-member front area arranged in front of each reinforcing part to incline outwardly in the width direction of the vehicle;

a sub-side member arranged so as to frontwardly extend from each reinforcing part, the sub-side member connected to the bumper reinforcement; and a deformation-mode control mechanism that allows the sub-side member to be deformed inwardly in the width direction of the vehicle due to the impact load, thereby to render the sub-side member interfered with the power unit.

14. The vehicle front body structure of claim 1, wherein the longitudinal structural members comprise a pair of side members arranged on left and right sides of the front compartment to extend in the fore-and-aft direction of the vehicle, the side members each having a reinforcing part for mounting the power unit.

15. The vehicle front body structure of claim 14, wherein the vehicle front body structure further comprises a bumper reinforcement connected with the front ends of the side members to extend in the width direction of the vehicle.

16. The vehicle front body structure of claim 15, wherein the impact load transfer mechanism comprises:

a side-member front area arranged in front of each reinforcing part to incline outwardly in the width direction of the vehicle, the side-member front area being provided with a strength control mechanism that controls a strength of each side member so that the maximum stress generated in the front part of each one of sections arranged in the longitudinal direction of each side member becomes more than or close to the maximum stress generated in the rear part of the each one of the sections.

17. The vehicle front body structure of claim 16, wherein the impact load transfer mechanism further comprises:

a sub-side member arranged so as to extend from each reinforcing part toward the front of the vehicle, substantially straight relative to an extension of a side-member rear area, the sub-side member connected to the bumper reinforcement at a front end of the sub-side member.

18. The vehicle front body structure of claim 17, wherein the impact load transfer mechanism further comprises:

a deformation-mode control mechanism that allows the sub-side member to be deformed inwardly in the width direction of the vehicle due to the impact load, thereby to render the sub-side member interfered with the power unit.

19. The vehicle front body structure of claim 17, wherein the side-member front area has its front end detachably connected with the bumper reinforcement, while the sub-side member has its front end fixed with the bumper reinforcement integrally, and the sub-side member has its rear end detachably connected with a connecting part between the side-member front area and the side-member rear area.

20. The vehicle front body structure of claim 17, wherein the side-member front area is separately formed from the side-member rear area, while the rear end of the side-member front area is detachably connected with the side member rear area at the vicinity of the reinforcing part, and the sub-side member is integrally formed with the side-member rear area.

21. The vehicle front body structure of claim 17, wherein each reinforcing part at the front end of the side-member rear area has a curved part formed to incline outwardly in the width direction of the vehicle, the side-member front area is separated from the front end of the curved part by a plane perpendicular to the longitudinal direction of the curved part, the side-member front area is detachably connected to the curved part, and the rear end of the sub-side member is also detachably connected to the curved part.

* * * * *